US006447741B1

(12) United States Patent
Chester et al.

(10) Patent No.: US 6,447,741 B1
(45) Date of Patent: Sep. 10, 2002

(54) THERMALLY STABLE, HIGH SURFACE AREA, MODIFIED MESOPOROUS ALUMINOPHOSPHATE MATERIAL

(75) Inventors: Arthur W. Chester, Cherry Hill; Frederick E. Daugherty, Gibbstown, both of NJ (US); Charles T. Kresge, West Chester, PA (US); Hye-Kyung C. Timken, Woodbury, NJ (US); James C. Vartuli, West Chester, PA (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/468,451

(22) Filed: Dec. 21, 1999

(51) Int. Cl.$^7$ .............................................. C01B 25/36
(52) U.S. Cl. ............... 423/305; 423/306; 423/DIG. 30; 502/209; 502/213; 502/63
(58) Field of Search ................................ 423/305, 306, 423/DIG. 30; 502/63, 209, 213

(56) References Cited

U.S. PATENT DOCUMENTS

| | | | |
|---|---|---|---|
| 4,158,621 A | 6/1979 | Swift et al. | 208/114 |
| 4,179,358 A | 12/1979 | Swift et al. | 208/114 |
| 4,743,572 A | 5/1988 | Angevine et al. | 502/64 |
| 4,767,733 A | 8/1988 | Chester et al. | 502/65 |
| 4,834,869 A | 5/1989 | Angevine et al. | 208/213 |
| 4,845,069 A | * 7/1989 | Fellmann et al. | 502/208 |
| 4,919,787 A | 4/1990 | Chester et al. | 208/52 |
| 5,264,203 A | 11/1993 | Beck et al. | 423/703 |

OTHER PUBLICATIONS

Galanos et al., "Influence of vanadium and cerium additives in the development of porosity and surface acid catalytic properties of mesoporous aluminophosphates", Stud. Surf. Sci. Cat., vol. 118 (Preparation of Catalysts VII), Elsevier Sci., 911–920, 1998.*

Luan, Z. et al., Tubular Aluminophosphate Mesoporous Materials Containing Framework Silicon, Vanadium and Manganese, *Mesoporous Molecular Sieves*, pp. 103–110 (1998).

Zhao, D. et al., Electron Spin Resonance and Electron Spin Echo Modulation Spectroscopy of Aluminophosphate—Based Mesoporous Manganese, *J. Phys. Chem. B*, vol. 101 Ch. 35, pp. 6943–6948 (1997).

* cited by examiner

*Primary Examiner*—Steven P. Griffin
*Assistant Examiner*—Maribel Medina Sanabria (57) ABSTRACT

A mesoporous aluminophosphate material includes a solid aluminophosphate composition modified with at least one element selected from zirconium, cerium, lanthanum, manganese, cobalt, zinc, and vanadium. This mesoporous aluminophosphate material has a specific surface area of at least 100 m$^2$/g, an average pore size less than or equal to 100 Å, and a pore size distribution such that at least 50% of the pores have a pore diameter less than 100 Å. The material can be used as a support for a catalytic cracking catalyst. Additionally, a method for making such a mesoporous aluminophosphate material is disclosed. The method, which preferably avoids use of organic reagents or solvents, includes providing an aqueous solution containing an inorganic phosphorus component; an inorganic aluminum containing component; and an inorganic modifying component containing at least one element selected from zirconium, cerium, lanthanum, manganese, cobalt, zinc, and vanadium. A solid mesoporous aluminophosphate material is formed in the solution by adjusting the pH of the solution to the range of 7 to 12 and is then recovered.

19 Claims, 1 Drawing Sheet

N2 Pore Size Distribution

- CoAlPOx, Sample C, 74A Average pore size
- CoAlPOx, Sample D, 152A Average pore size
- CoAlPOx, Sample E, 108A Average pore size Pore Size, Angstrom

THERMALLY STABLE, HIGH SURFACE AREA, MODIFIED MESOPOROUS ALUMINOPHOSPHATE MATERIAL

BACKGROUND OF THE INVENTION

A. Field of the Invention

This invention relates to mesoporous aluminophosphate materials that are modified with at least one element selected from zirconium, cerium, lanthanum, manganese, cobalt, zinc, and vanadium. The materials have high surface area and excellent thermal and hydrothermal stability, with a relatively narrow pore size distribution in the mesoporous range.

Methods for producing the modified aluminophosphate materials also are disclosed. Advantageously, this material can be used as a support for a cracking catalyst, for example, in a fluid catalytic cracking process.

B. Description of the Prior Art

Amorphous metallophosphates are known and have been prepared by various techniques. One such material is described in U.S. Pat. No. 4,767,733. This patent describes rare earth aluminum phosphate materials, which, after calcination, have a relatively broad pore size distribution with a large percentage of pores greater than 150 Å. The typical pore size distribution is as follows:

| Pore Size | Volume Percent |
| --- | --- |
| 50 to 100 Å | 5 to 20% |
| 100 to 150 Å | 10 to 35% |
| 150 to 200 Å | 15 to 50% |
| 200 to 400 Å | 10 to 50% |

U.S. Pat. Nos. 4,743,572 and 4,834,869 describe magnesia-alumina-aluminum phosphate support materials prepared using organic cations (e.g., tertiary or tetraalkylammonium or phosphonium cations) to control the pore size distribution. When organic cations are used in the synthesis, the resulting materials have a narrow pore size distribution in the range from 30 to 100 Å. When they are not used, the pore size is predominantly greater than 200 Å. U.S. Pat. No. 4,179,358 also describes magnesium-alumina-aluminum phosphate materials, materials described as having excellent thermal stability.

The use of aluminophosphates in cracking catalysts is known. For example, U.S. Pat. No. 4,919,787 describes the use of porous, rare earth oxide, alumina, and aluminum phosphate precipitates for catalytic cracking. This material was used as part of a cracking catalyst, where it acted as a metal passivating agent. The use of a magnesia-alumina-aluminum phosphate supported catalyst for cracking gasoline feedstock is described in U.S. Pat. No. 4,179,358. Additionally, a process for catalytic cracking high-metals-content-charge stocks using an alumina-aluminum phosphate-silica-zeolite catalyst is described in U.S. Pat. No. 4,158,621.

There remains a need in the art for highly stable aluminophosphate materials for use in catalytic cracking processes, as well as for simple, safe processes for producing these materials. The aluminophosphate materials preferably possess excellent hydrothermal and acid stability with uniform pore sizes in the mesoporous range, and provide increased gasoline yields with increased butylene selectivity in $C_4^-$ gas.

SUMMARY OF THE INVENTION

This invention relates, in a first aspect, to a mesoporous aluminophosphate material comprising a solid aluminophosphate composition modified with at least one element selected from zirconium, cerium, lanthanum, manganese, cobalt, zinc, and vanadium, wherein the mesoporous aluminophosphate material has a specific surface of at least 100 $m^2/g$, an average pore diameter less than or equal to 100 Å, and a pore size distribution such that at least 50% of the pores have a pore diameter less than 100 Å.

Preferably, the mesoporous aluminophosphate material has an average pore diameter of 30 to 100 Å.

The invention also relates to a method of making the mesoporous aluminophosphate material described above, the method comprising the steps of:

(a) providing an aqueous solution containing a phosphorus component; an inorganic aluminum containing component; and an inorganic modifying component containing at least one element selected from zirconium, cerium, lanthanum, manganese, cobalt, zinc, and vanadium;

(b) adjusting the pH of said aqueous solution into the range of about 7 to about 12 so that a solid material is precipitated from said solution; and then (c) recovering the solid material from said solution, wherein the solid material includes the mesoporous aluminophosphate material.

Preferably, the inorganic aluminum containing component includes sodium aluminate and the method includes the further step of lowering the sodium level of the solid material recovered in step (c). This may be achieved by ion exchange with an ammonium salt or an acid. Typically, the sodium level of the final aluminophospate material is less than 1.0 wt % Na.

Preferably, the method includes the further step of exposing the aqueous solution, after step (b) but before step (c), to hydrothermal or thermal treatment at about 100° C. to about 200° C. to facilitate uniform pore formation.

Advantageously, the solid materials according to the invention can be used as solid support materials for fluid catalytic cracking ("FCC") catalysts.

DETAILED DESCRIPTION OF THE INVENTION

Figure 1:
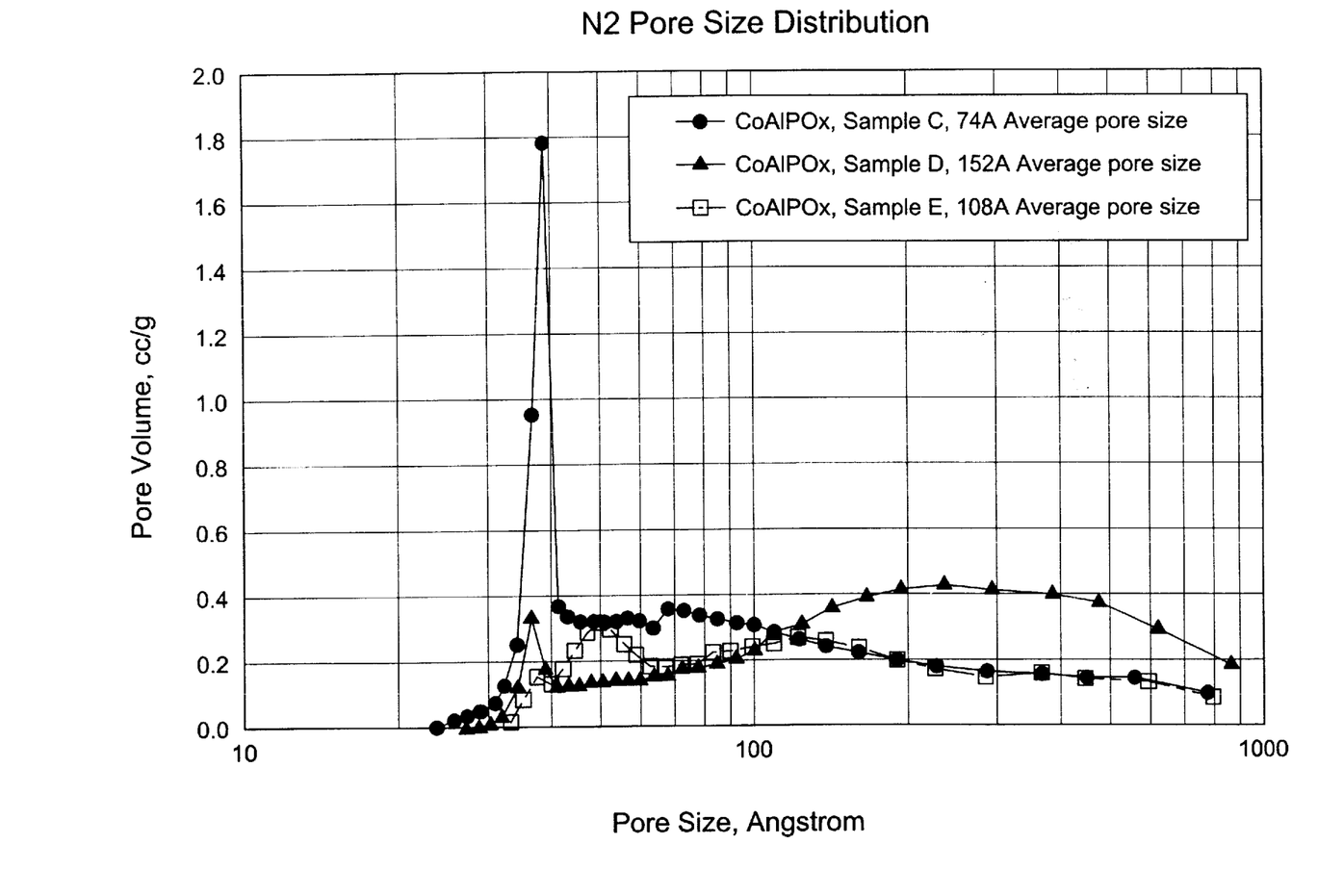
The FIGURE shows pore size distribution variation with average pore size after severe steaming for Samples A–C, $CoAlPO_x$ gels having the narrowly-defined mesopores structure of the present invention, which suggests excellent hydrothermal stability in that they maintained over 100 $m^2/g$ surface area even after severe steaming.

A mesoporous aluminophosphate material according to this invention, as described above, includes a solid aluminophosphate composition modified with at least one element selected from zirconium, cerium, lanthanum, manganese, cobalt, zinc, and vanadium. "Mesoporous," as used in this patent application, means a material having pores with diameters in the approximate range 30–100 Å.

Various preferred properties of the aluminophosphate materials according to the invention have been identified. In its preferred embodiments, the materials according to the invention have a specific surface area of at least 100 $m^2/g$, preferably at least 125 $m^2/g$, and most advantageously at least 175 $m^2/g$. Additionally, the pore sizes of the materials according to the invention provide a mesoporous material.

In general, the average pore diameter of the materials according to the invention is less than or equal to 100 Å, preferably less than 80 Å, and most advantageously less than 60 Å.

Pore size distribution and pore volume provide other measures of the porosity of a material. In preferred modified aluminophosphate materials according to this invention, 50% or more of the pores have a diameter less than 100 Å, more preferably 60% or more of the pores have a diameter less than 100 Å, and most preferably, 80% or more of the pores have a diameter less than 100 Å. With respect to the pore volume, the aluminophosphate materials according to the invention preferably have a pore volume in the range from 0.10 cc/g to 0.75 cc/g, and more preferably within the range of 0.20 to 0.60 cc/g.

The invention further relates to methods for making mesoporous aluminophosphate materials according to the invention. In one particularly advantageous aspect of this method, no organic reagents or solvents are used to produce the mesoporous aluminophosphate material; rather, water, inorganic reactants, and aqueous solutions are used. This feature simplifies production and waste disposal for the method of the invention. The method of the invention includes providing an aqueous solution that contains a phosphorus component (e.g., phosphoric acid, phosphate salts such as ammonium phosphate which can be monobasic, dibasic or tribasic salt); an inorganic aluminum containing component (e.g., sodium aluminate, aluminum sulfate, or combinations of these materials); and an inorganic modifying component containing at least one element selected from zirconium, cerium, lanthanum, iron, manganese, cobalt, zinc, and vanadium. Typically, the molar ratios of the starting materials are as follows:

| Component | Useful | Preferred |
| --- | --- | --- |
| Phosphorus component | 0.02–0.90 | 0.05–0.85 |
| Aluminum containing component | 0.02–0.90 | 0.05–0.85 |
| Inorganic modifying component | 0.01–0.50 | 0.02–0.40 |

After thoroughly mixing the ingredients, the pH of the aqueous solution is adjusted, with an acid or base, into the range of about 7 to about 12 so that a solid material (e.g., a homogeneous gel) forms in and precipitates from the solution. After pH adjustment, the aqueous solution may be exposed to hydrothermal or thermal treatment at about 100° C. to about 200° C. to further facilitate uniform pore formation. After formation, the solid material, which includes the desired aluminophosphate material, can be recovered by any suitable method known in the art, e.g., by filtration. The filtered cake is then washed with water to remove any trapped salt, and then may be contacted with a solution containing ammonium salt or acid to exchange out the sodium ions. Such reduction in the sodium level of is found to increase the hydrothermal stability of the aluminophosphate material. Typically, the sodium level of the final aluminophospate material should less than 1.0 wt % Na. After washing and optional exchange, the solid material is dried and calcined.

Although any suitable inorganic modifying component can be used without departing from the invention, preferably it is a sulfate or a nitrate of zirconium, cerium, lanthanum, manganese, cobalt, zinc, or vanadium.

The modified aluminophosphate materials according to the invention can be used in cracking catalysts for catalytic cracking processes, preferably as a support in combination with other cracking catalyst materials, such as zeolites (e.g., USY zeolites), and activated matrix. Other conventional cracking catalyst materials, such as binding agents, clays, alumina, silica-alumina, and the like, can also be included as part of the cracking catalyst.

As is well known in the art, catalytic cracking processes convert feedstock hydrocarbon compounds to product hydrocarbon compounds of lower molecular weight than the feedstock hydrocarbon compounds. In particular, the modified aluminophosphate materials according to the present invention can be used in catalytic processes operating at temperatures from about 200° C. to about 870° C. and under reduced, atmospheric or superatmospheric pressure. The catalytic process can be either fixed bed, moving bed or fluidized bed and the hydrocarbon flow may be either concurrent or countercurrent to the catalyst flow. The modified aluminophosphate materials of the invention are useful in the Fluid Catalytic Cracking (FCC) and Thermofor Catalytic Cracking (TCC) processes.

The TCC process is a moving bed process and the catalyst is in the shape of pellets or beads having an average particle size of about one-sixty-fourth to one-fourth inch. Active, hot catalyst beads progress downwardly concurrent with a hydrocarbon charge stock through a cracking reaction zone. The hydrocarbon products are separated from the coked catalyst and recovered, and the catalyst is recovered at the lower end of the zone and regenerated. Typically TCC conversion conditions include an average reactor temperature of about 450° C. to about 510° C.; catalyst/oil volume ratio of about 2 to about 7; reactor space velocity of about 1 to about 2.5 vol./hr./vol.; and recycle to fresh feed ratio of 0 to about 0.5 (volume).

The modified aluminophosphate materials of the invention are particularly useful in fluid catalytic cracking (FCC), in which the cracking catalyst is typically a fine powder with a particle size of about 10 to 200 microns. This powder is generally suspended in the feed and propelled upward in a reaction zone. A relatively heavy hydrocarbon feedstock, e.g., a gas oil, is admixed with the cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Typically, FCC conversion conditions include a riser top temperature of about 500° C. to about 595° C., preferably from about 520° C. to about 565° C., and most preferably from about 530° C. to about 550° C.; catalyst/oil weight ratio of about 3 to about 12, preferably about 4 to about 11, and most preferably about 5 to about 10; and catalyst residence time of about 0.5 to about 15 seconds, preferably about 1 to about 10 seconds.

The hydrocarbon feedstock to be cracked may include, in whole or in part, a gas oil (e.g., light, medium, or heavy gas oil) having an initial boiling point above 204° C., a 50% point of at least 260° C. and an end point of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed for convenience in terms of the boiling point corrected to atmospheric pressure. Resids or deeper cut gas oils with high metals contents can also be cracked using catalysts employing the modified aluminophosphate materials of the invention.

The invention will now be more particularly described with reference to the following Examples. In the Examples, pore size distributions are measured by a $N_2$ desorption process based on ASTM method D4641 and pore volumes are measured by a $N_2$ adsorption process based on ASTM method D4222, which documents are entirely incorporated herein by reference. The pore volume and pore size distribution data reported herein correspond to pores ranging from approximately 14 to 1000 Å in radius, and do not include any microporous pores which have typically less than 14 Å in radius.

EXAMPLE 1

Zirconium Aluminophosphate

A. Production of the Support Material

A zirconium modified aluminophosphate material was prepared by mixing together, at 40° C., 1700 grams of water, 29 grams of concentrated phosphoric acid, 133 grams of zirconium sulfate, and 170 grams of sodium aluminate. In this mixture, the zirconium/aluminum/phosphorus molar ratio was 0.35/0.5/0.15. Åafter thoroughly mixing these ingredients, the pH of the solution was adjusted to 11 using ammonium hydroxide. The resulting mixture was transferred to a polypropylene bottle and placed in a steam box (100° C.) for 48 hours. The mixture was then filtered to separate the solid material from the liquid, and the solid material was washed to provide a wet cake, a portion of which was dried at about 85° C. (another portion of this washed material was used in the following test for measuring its hydrothermal stability). A portion of the dried solid material was calcined in air at 540° C. for six hours. The resulting zirconium aluminophosphate material had the following properties and characteristics:

| Elemental Analysis | Weight Percent |
|---|---|
| Zr | 26.4 |
| Al | 24.3 |
| P | 4.0 |
| Surface Area - 175 m²/g | |
| Average pore diameter - 41 Å | |
| Pore volume - 0.21 cc/g | |

| Pore Size Distribution | Desorption, % |
|---|---|
| <50 Å | 80% |
| 50 – 100 Å | 10% |
| 100 – 150 Å | 5% |
| >150 Å | 5% |

B. Hydrothermal Stability Test

A portion of the wet cake from Example 1A above was slurried with deionized (DI) water (20 g DI water per g of $ZrAlPO_x$). The pH of the slurry was adjusted to 4.0 by adding concentrated HCl solution while stirring for 15 minutes. Then the cake was filtered and washed until it was free of residual chloride. The resultant material was dried at 120° C. overnight and then air calcined at 540° C. for three hours. One portion of this calcined material was steamed (100% atmospheric pressure steam) at 815° C. for 2 hours, and another portion was steamed at 815° C. for 4 hours. The surface area of the calcined and steamed materials were as follows:

| Material | Surface Area, m²/g |
|---|---|
| Calcined only | 227 |
| Steamed for 2 hours | 85 |
| Steamed for 4 hours | 68 |

These results demonstrate that the zirconium aluminophosphate material according to the invention is hydrothermally stable and maintains about 30% or more of its surface area under the severe steam deactivating conditions, such as would be experienced in a FCC regenerator. It will also be seen that sodium removal resulting from the acid exchange increased the surface area of the base air calcined material from 175 m²/g for the product of Example 1A to 227 m²/g for the product of Example 1B.

EXAMPLE 2

Cerium Aluminophosphate

A. Production of the Support Material

A cerium modified aluminophosphate material was prepared by mixing together, at 40° C., 2100 grams of water, 45 grams of concentrated phosphoric acid, 133 grams of cerium sulfate, 75 grams of concentrated sulfuric acid, and 760 grams of sodium aluminate. In this mixture, the cerium/aluminum/phosphorus molar ratio was 1/8/1. After thoroughly mixing these ingredients, the pH of the solution was adjusted to 7 using 50% sulfufric acid. The resulting mixture was transferred to a polypropylene bottle and placed in a steam box (100° C.) for 48 hours. The mixture was then filtered to separate the solid material from the liquid, and the solid material was washed to provide a wet cake, a portion of which was dried at about 85° C. (another portion of this washed material was used in the following hydrothermal stability test). A portion of this solid material was calcined in air at 540° C. for six hours. The resulting cerium aluminophosphate material had the following properties and characteristics:

| Elemental Analysis | Weight Percent |
|---|---|
| Ce | 8.6 |
| Al | 36.2 |
| P | 1.6 |
| Surface Area - 272 m²/g | |
| Average pore diameter - 65 Å | |
| Pore volume - 0.50 cc/g | |

| Pore Size Distribution | Desorption, % |
|---|---|

-continued

| | |
|---|---|
| <50 Å | 44% |
| 50 – 100 Å | 20% |
| 100 – 150 Å | 12% |
| >150 Å | 24% |

B. Hydrothermal Stability Test

A portion of the wet cake from Example 2A above was slurried with deionized (DI) water (20 g DI water per g of CeAlPO$_x$). The pH of the slurry was adjusted to 4.0 by adding concentrated HCl solution while stirring for 15 minutes. Then the cake was filtered and washed until it was free of residual chloride. The resultant material was dried at 120° C. overnight and then air calcined at 540° C. for three hours. One portion of this calcined material was steamed (100% atmospheric pressure steam) at 815° C. for 2 hours, and another portion was steamed at 815° C. for 4 hours. The surface area of these calcined and steamed materials were as follows:

| Material | Surface Area, m$^2$/g |
|---|---|
| Calcined only | 272 |
| Steamed for 2 hours | 138 |
| Steamed for 4 hours | 143 |

These results demonstrate that the cerium aluminophosphate material according to the invention is hydrothermally stable and maintains greater than 50% of its surface area under these severe steam deactivating conditions.

EXAMPLE 3

Cerium Aluminophosphate

Another cerium modified aluminophosphate material was prepared by mixing together, at 40° C., 2100 grams of water, 360 grams of concentrated phosphoric acid, 135 grams of cerium sulfate, and 100 grams of aluminum sulfate. In this mixture, the cerium/aluminum/phosphorus molar ratio was 1/1/8. After thoroughly mixing these ingredients, the pH of the solution was adjusted to 7 using ammonium hydroxide. The resulting mixture was transferred to a polypropylene bottle and placed in a steam box (100° C.) for 48 hours. The mixture was then filtered to separate the solid material from the liquid, and the solid material was washed and dried at about 85° C. This solid material was calcined in air at 540° C. for six hours. The resulting cerium aluminophosphate material had the following properties and characteristics:

| Elemental Analysis | Weight Percent |
|---|---|
| Ce | 31.4 |
| Al | 5.5 |
| P | 21.0 |
| Surface Area - 133 m$^2$/g | |
| Average pore diameter - 93 Å | |
| Pore volume - 0.31 cc/g | |

| Pore Size Distribution | Desorption, % |
|---|---|
| <50 Å | 33% |
| 50 – 100 Å | 18% |
| 100 – 150 Å | 12% |
| >150 Å | 27% |

EXAMPLE 4

Lanthanum Aluminophosphate

A lanthanum modified aluminophosphate material was prepared as follows. A first solution was prepared by mixing together 2500 grams of water, 90 grams of concentrated phosphoric acid, and 260 grams of lanthanum nitrate. A second solution was prepared by combining 1670 grams of water and 600 grams of sodium aluminate. These two solutions were combined with stirring. The lanthanum/aluminum/phosphorus molar ratio of this mixture was 1/8/1. After thoroughly mixing these solutions, the pH of the resulting mixture was adjusted to 12 by adding 150 grams of sulfuric acid. The resulting mixture was then transferred to a polypropylene bottle and placed in a steam box (100° C.) for 48 hours. Thereafter, the mixture was filtered to separate the solid material from the liquid, and the solid material was washed and dried at about 85° C. This solid material was calcined in air at 540° C. for six hours. The resulting lanthanum aluminophosphate material had the following properties and characteristics:

| Elemental Analysis | Weight Percent |
|---|---|
| La | 16.6 |
| Al | 29.8 |
| P | 4.8 |
| Surface Area - 123 m$^2$/g | |
| Average pore diameter - 84 Å | |
| Pore volume - 0.26 cc/g | |

| Pore Size Distribution | Desorption, % |
|---|---|
| <50 Å | 32% |
| 50 – 100 Å | 56% |
| 100 – 150 Å | 10% |
| >150 Å | <5% |

EXAMPLE 5

Manganese Aluminophosphate

A manganese modified aluminophosphate material was prepared by mixing together 2100 grams of water, 45 grams of concentrated phosphoric acid, 68 grams of manganese sulfate, and 760 grams of aluminum sulfate. In this mixture, the manganese/aluminum/phosphorus molar ratio was 1/8/1. After thoroughly mixing these ingredients, the pH of the solution was adjusted to 11 by adding ammonium hydroxide. The resulting mixture was transferred to a polypropylene bottle and placed in a steam box (100° C.) for 48 hours. The mixture was then filtered to separate the solid material from the liquid, and the solid material was washed and dried at about 85° C. The solid material was re-slurried with deionized water (20 cc of DI water/g of MnAlPO$_x$) and the pH of the slurry was adjusted to 4.0 or slightly below with a concentrated HCl solution. The pH was maintained for 15 minutes and filtered to separate the solid material from the liquid. The filter cake was washed thoroughly with 70° C. DI water until the washed solution is free of chloride anion, dried overnight at 120° C., and then calcined in air at 540° C. for six hours. The resulting manganese aluminophosphate material had the properties and characteristics listed in Table 1.

EXAMPLE 6

Zinc Aluminophosphate

A zinc modified aluminophosphate material was prepared by mixing together 2100 grams of water, 45 grams of concentrated phosphoric acid, 115 grams of zinc sulfate, 75 grams of sulfuric acid, and 760 grams of sodium aluminate. In this mixture, the zinc/aluminum/phosphorus molar ratio was 1/8/1. After thoroughly mixing these ingredients, the pH of the solution was adjusted to 11 by adding 50% sulfuric acid. The resulting mixture was transferred to a polypropylene bottle and placed in a steam box (100° C.) for 48 hours. The mixture was then filtered to separate the solid material from the liquid, and the solid material was washed and dried at about 85° C. The solid material was re-slurried with deionized water (20 cc of DI water/g of $ZnAlPO_x$) and the pH of the slurry was adjusted to 4.0 or slightly below with a concentrated HCl solution. The pH was maintained for 15 minutes and filtered to separate the solid material from the liquid. The filter cake was washed thoroughly with 70° C. DI water, dried overnight at 120° C., and then calcined in air at 540° C. for six hours. The resulting zinc aluminophosphate material had the properties and characteristics listed in Table 1.

EXAMPLE 7 (COMPARATIVE)

Iron Aluminophosphate

A solution was prepared by mixing 1700 grams of water, 65 grams of concentrated phosphoric acid, 200 grams of ferrous sulfate, and 110 grams of aluminum sulfate. The molar ratio of the iron/aluminum/phosphorous was 0.34/0.33/0.33. The pH of the product was adjusted to 7 with the addition of concentrated ammonium hydroxide. The material was then filtered and washed and dried at ~85° C. A portion of the material was air calcined to 540° C. for six hours. The resulting iron aluminophosphate material had the properties and characteristics listed in Table 1.

TABLE 1

|  | ZnAlPOx Example 5 Invention | MnAlPOx Example 6 Invention | FeAlPOx Example 7 Comparative |
|---|---|---|---|
| Calcined Acid Form |  |  |  |
| Metal loading, wt % | 4.2% Zn | 5.7% Mn | 21% Fe |
| $Al_2O_3$, wt % | — | — | 12.2 |
| P, wt % | — | — | 12.4 |
| Na, wt % | 0.22 | 0.08 | 0.009 |
| Surface area, $m^2/g$ | 314 | 244 | 109 |
| Average pore diameter (Å) | 50 | 44 | 202 |
| Pore volume (>14 Å), cc/g | 0.37 | 0.26 | 0.55 |
| Pore size distribution, % |  |  |  |
| <50 Å | 39 | 75 | 4 |
| 50–100 Å | 17 | 23 | 12 |
| 100–150 Å | 9 | 1 | 15 |
| >150 Å | 35 | 1 | 69 |
| Steam Deactivated Catalyst (1500° F. for 4 hrs) |  |  |  |
| Surface area, $m^2/g$ | 155 | 103 | 6 |

The results in Table 1 show that $ZnAlPO_x$ and $MnAlPO_x$ of the invention retained a surface area in excess of 100 $m^2/g$ after severe steaming. However, the $FeAlPO_x$ with a pore size distribution outside the invention lost almost all of its surface area upon steaming.

EXAMPLE 8

Cobalt Aluminophosphate

Sample A (Invention)

A solution was prepared by mixing 500 grams of water, 45 grams of concentrated phosphoric acid, 117 grams of cobalt nitrate and 75 grams of concentrated sulfuric acid. Another solution was prepared containing 1600 grams of water and 300 grams of sodium aluminate. These two solutions were combined with stirring. The molar ratio of the cobalt/aluminum/phosphorous was 1/8/1. The pH of the mixture was adjusted to 9 with the addition of 50% solution of sulfuric acid. The resulting mixture was placed in a polypropylene bottle and put in a steam box (100° C.) for 48 hours. The mixture was then filtered and the solid residue was washed and dried at ~85° C. A portion of the residue was air calcined to 540° C. for six hours. The elemental analyses and physical properties were as follows:

| Element, wt % | |
|---|---|
| Co | 7.1 |
| Al | 25.3 |
| P | 3.4 |
| Surface Area, $m^2/g$ | 145 |

A portion of the above material was exchanged four times with a 0.1N solution of ammonium nitrate and the resulting material was then filtered and washed and dried at ~85° C. A portion of the material was air calcined to 540° C. for six hours. The resulting cobalt aluminophosphate material had the properties and characteristics listed in Table 2.

Sample B (Invention)

A solution was prepared by mixing 2100 grams of water, 45 grams of concentrated phosphoric acid, 117 grams of cobalt nitrate, 75 grams of concentrated sulfuric acid, and 300 grams of sodium aluminate. The molar ratio of the cobalt/aluminum/phosphorous was 1/8/1. The pH of the mixture was adjusted to 8 with the addition of 50% solution of sulfuric acid. The resulting mixture was placed in a polypropylene bottle and put in a steam box (100° C.) for 48 hours. The mixture was then filtered and the solid residue was washed and dried at ~85° C. A portion of the residue was air calcined to 540° C. for six hours. The elemental analyses and physical properties were as follows:

| Element, wt % | |
|---|---|
| Co | 6.0 |
| Al | 19.2 |
| P | 2.6 |
| Surface Area, $m^2/g$ | 114 |

A portion of the above material was exchanged four times with a 0.1N solution of ammonium nitrate and the resulting material was then filtered and washed and dried at ~85° C. A portion of the material was air calcined to 540° C. for six hours. The resulting cobalt aluminophosphate material had the properties and characteristics listed in Table 2.

Sample C (Invention)

A cobalt modified aluminophosphate material was prepared in the same manner as for Sample B above, except the pH of the mixture was adjusted to 7 with the addition of 50% solution of sulfuric acid. The elemental analyses and physical properties of the product were as follows:

| Element, wt % | |
|---|---|
| Co | 6.8 |
| Al | 19.6 |
| P | 2.9 |

A portion of the above material was slurried with DI water (20 g DI water per g of $CoAlPO_x$). The pH of the slurry was adjusted to 4.0 by adding concentrated HCl solution while stirring for 15 minutes. Then the cake was filtered and washed until it was free of residual chloride. The gel was dried at 120° C. for overnight and calcined in air at 538° C. for 3 hours. The resulting cobalt aluminophosphate material had the properties and characteristics listed in Table 2.

Sample D (Comparative)

A cobalt modified aluminophosphate material was prepared by mixing 2100 grams of water, 45 grams of concentrated phosphoric acid, 117 grams of cobalt nitrate, 75 grams of concentrated sulfuric acid, and 300 grams of aluminum sulfate. The molar ratio of the cobalt/aluminum/phosphorous was 1/8/1. The pH of the mixture was adjusted to 11 with the addition of concentrated ammonium hydroxide. The resulting mixture was placed in a polypropylene bottle and put in a steam box (100° C.) for 48 hours. The mixture was then filtered and the solid residue was washed and dried at ~85° C. A portion of the residue was air calcined to 540° C. for six hours. The elemental analyses and physical properties were as follows:

| Element, wt % | |
|---|---|
| Co | 10.7 |
| Al | 27.4 |
| P | 5.8 |

A portion of the above material was slurried with DI water (20 g DI water per g of $CoAlPO_x$). The pH of the slurry was adjusted to 4.0 by adding concentrated HCl solution while stirring for 15 minutes. Then the cake was filtered and washed until it was free of residual chloride. The gel was dried at 120° C. for overnight and calcined in air at 538° C. for 3 hours. The resulting cobalt aluminophosphate material had the properties and characteristics listed in Table 2.

Sample E (Comparative)

A cobalt modified aluminophosphate material was prepared from a solution which was prepared with mixing, containing 1700 grams of water, 29 grams of concentrated phosphoric acid, 213 grams of cobalt nitrate, and 170 grams of aluminum sulfate. The molar ratio of the cobalt/aluminum/phosphorous was 0.35/0.5/0.15. The pH of the mixture was adjusted to 7 with the addition of concentrated ammonium hydroxide. The resulting mixture was placed in a polypropylene bottle and put in a steam box (100° C.) for 48 hours. The mixture was then filtered and the solid residue was washed and dried at ~85° C. A portion of the residue was air calcined to 540° C. for six hours. The elemental analyses and physical properties were as follows:

| Element, wt % | |
|---|---|
| Co | 28 |
| Al | 10.9 |
| P | 6.3 |

A portion of the above material was slurried with DI water (20 g DI water per g of $CoAlPO_x$). The pH of the slurry was adjusted to 4.0 by adding concentrated HCl solution while stirring for 15 minutes. Then the cake was filtered and washed until it was free of residual chloride. The gel was dried at 120° C. for overnight and calcined in air at 538° C. for 3 hours. The resulting cobalt aluminophosphate material had the properties and characteristics listed in Table 2.

Hydrothermal Stability Test of the $CoAlPO_x$ Samples

The hydrothermal stability of each $CoAlPO_x$ gel was evaluated by steaming the material at 1500° F. (815° C.) for 4 hours with 100% steam at atmospheric pressure. The results are given in Table 2 below and the FIGURE. The results show that Samples A–C, with the average pore size and pore size distribution according to the invention, exhibited excellent hydrothermal stability in that they maintained over 100 $m^2/g$ surface area even after severe steaming. In contrast, Samples D and E, without the narrowly-defined mesopores structure of the invention, lost nearly all of their surface area upon steaming at 1500° F.

TABLE 2

| Sample | A | B | C | D | E |
|---|---|---|---|---|---|
| Calcined Acid Form | | | | | |
| Co loading, wt % | 6.2 | 7.9 | 10 | 15 | 28 |
| Al2O3, wt % | 47.8 | 36 | 51 | 18 | 20 |
| P, wt % | 3.4 | 2.6 | 4 | 11 | 10 |
| Na, wt % | 0.49 | 0.28 | 0.05 | 0.01 | 0.01 |
| Surface area, m2/g | 321 | 247 | 75 | 103 | 82 |
| Average pore diameter (Å) | 67 | 74 | 74 | 152 | 108 |
| Pore volume (>14 Å), cc/g | 0.55 | 0.44 | 0.37 | 0.38 | 0.24 |
| Pore size distribution, % | | | | | |
| <50 Å | 38 | 29 | 32 | 8 | 13 |
| 50–100 Å | 32 | 39 | 27 | 14 | 27 |
| 100–150 Å | 9 | 11 | 3 | 14 | 19 |
| >150 Å | 21 | 21 | 28 | 64 | 41 |
| Steam Deactivated Catalyst (1500° F. for 4 hrs) | | | | | |
| Surface area, $m^2/g$ | 128 | 113 | 111 | 29 | 18 |

EXAMPLE 9

Vanadium Aluminophosphate

Sample F

A solution was prepared by mixing 2100 grams of water, 45 grams of concentrated phosphoric acid, 87 grams of vanadyl sulfate, 75 grams of concentrated sulfuric acid and 760 grams of sodium aluminate. The molar ratio of the vanadium/aluminum/phosphorous was 1/8/1. The pH of the mixture was adjusted to 7 with the addition of 50% sulfuric acid. The mixture was then filtered and the solid residue washed and dried at about 85° C. A portion of the dried material was air calcined to 540° C. for six hours. The elemental analyses and physical properties of resulting vanadium aluminophosphate material were as follows:

| Element, wt % | |
|---|---|
| V | 3.0 |
| Al | 17.0 |
| P | 1.7 |
| Surface Area, $m^2/g$ | 335 |

A further portion of the above dried material was slurried with DI water (20 g DI water per g of $VAlPO_x$). The pH of the slurry was adjusted to 4.0 by adding concentrated HCl solution while stirring for 15 minutes. Then the cake was filtered and washed until it was free of residual chloride. The gel was dried at 120° C. for overnight and calcined in air at 538° C. for 3 hours. The resulting vanadium aluminophosphate material had the properties and characteristics listed in Table 3.

Sample G

A solution was prepared by mixing 2100 grams of water, 45 grams of concentrated phosphoric acid, 87 grams of vanadyl sulfate, 75 grams of concentrated sulfuric acid and 760 grams of sodium aluminate. The molar ratio of the vanadium/aluminum/phosphorous was 1/8/1. The pH of the mixture was adjusted to 8 with the addition of 50% solution of sulfuric acid. The elemental analyses and physical properties of the resulting vanadium aluminophosphate material were as follows:

| Element, wt % | |
|---|---|
| V | 2.1 |
| Al | 20.9 |
| P | 1.2 |
| Surface Area, m$^2$/g | 130 |

A further portion of the above dried material was exchanged four times with a 0.1N solution of ammonium nitrate to remove the excess sodium, and the resultant product was then filtered and the residue washed and dried at about 85° C. A portion of the residue was air calcined to 540° C. for six hours. The resulting vanadium aluminophosphate material had the properties and characteristics listed in Table 3.

The calcined acid form of each of the VAlPO$_x$ Samples F and G were subjected to the steam deactivation test described above and the results are summarized in Table 3.

TABLE 3

| | VAlPOx Sample F Invention | VAlPOx Sample G Invention |
|---|---|---|
| Calcined Acid Form | | |
| V loading, wt % | 3.0 | 2.1 |
| Al$_2$O$_3$, wt % | 39 | 35.6 |
| P, wt % | 1.2 | 0.3 |
| Na, wt % | 0.59 | 0.83 |
| Surface area, m$^2$/g | 317 | 304 |
| Average pore diameter (Å) | 53 | 36 |
| Pore volume (>14Å), cc/g | 0.42 | 0.27 |
| Pore size distribution, % | | |
| <50 Å | 55 | 82 |
| 50–100 Å | 20 | 10 |
| 100–150 Å | 6 | 2 |
| >150 Å | 19 | 6 |
| Steam Deactivated Catalyst (1500 F. for 4 hrs) | | |
| Surface area, m$^2$/g | 81 | 126 |

The results in Table 3 show that Samples F and G, with the average pore size and pore size distribution according to the invention, exhibited excellent hydrothermal stability. Sample G prepared under higher pH conditions exhibited better stability in that it maintained over 100 m$^2$/g surface area even after severe steaming.

EXAMPLE 10

Fluid Catalytic Cracking with ZrAlPO$_x$

A. Preparation of a ZrAlPO$_x$ Material

A thermally stable, high surface area, mesoporous ZrAlPO$_x$ material was prepared as described above in Example 1. The described wet cake of ZrAlPO$_x$ was used for the catalyst preparations that follow.

B. Preparation of a USY/ZrAlPO$_x$/Clay Catalyst

A first catalyst, Catalyst A, was prepared using commercial Na-form USY zeolite with a silica to alumina ratio of 5.4 and a unit cell size of 24.54 Å. The Na-form USY was slurried and ball milled for 16 hours. A wet cake of the ZrAlPO$_x$ material above was slurried in deionized water, and the pH of the resultant slurry was adjusted to 4 using concentrated HCl. The ZrAlPO$_x$ material was then filtered, washed, and ball milled for 16 hours.

A uniform physical mixture of the milled USY slurry, the milled ZrAlPO$_x$ slurry, binding agent, and kaolin clay was prepared. The final slurry contained 21% USY, 25% ZrAlPO$_x$, 7% binding agent, and 47% clay, on a 100% solids basis. The mixture was spray-dried to fine spherical particles with approximately 70$\mu$ average particle diameter. The sprayed product was then air calcined, followed by ammonium exchange using an ammonium sulfate solution. The exchanged catalyst was further washed with deionized water, dried overnight, and calcined at 538° C. for three hours. The properties of the final catalyst are shown in Table 4.

C. Preparation of a USY/Alumina/Clay Catalyst

A second catalyst, Catalyst B, was prepared following the procedure in Example 10B, above, except that the ZrAlPO$_x$ in Catalyst A was replaced with HCl-peptized alumina. The peptized alumina gel was prepared from pseudoboehmite alumina powder that was peptized with HCl solution for 30 minutes (at 12 wt % solids). The properties of Catalyst B also are shown in Table 4.

D. Preparation of a USY/ZrAlPO$_x$/Alumina/Clay Catalyst

A third catalyst, Catalyst C, was prepared following the procedure in Example 10B, above, except that the amount of ZrAlPO$_x$ was reduced and part of the clay was replaced with the HCl-peptized alumina used in Example 10C so that the spray dried slurry contained 21% USY, 15% ZrAlPO$_x$, 25% alumina, 7% binding agent, and 32% clay, on a 100% solids basis. The final properties of Catalyst C are shown in Table 4.

E. Preparation of a USY/ZrAlPO$_x$/Alumina/Clay Catalyst

A fourth catalyst, Catalyst D, was prepared following the procedure in Example 10D, above, except that the ZrAlPO$_x$ in Catalyst C was replaced with HCl-peptized ZrAlPO$_x$ gel, prepared by peptization of wet cake using HCl solution. The properties of Catalyst D also are shown in Table 4.

Before evaluating the catalysts for performance on a pilot unit for catalytic cracking, each catalyst was deactivated at 1450° F. and 35 psig for 20 hours using 50% steam and 50% air. The surface areas of the steamed catalysts are shown in Table 4.

TABLE 4

| Compositional Feature | Catalyst A 25% ZrAlPO$_x$ and No Alumina | Catalyst B 25% Alumina and No ZrAlPO$_x$ | Catalyst C 15% Ball Milled ZrAlPO$_x$ (Replace Part of Clay) and 25% Alumina | Catalyst D 15% Peptized ZrAlPO$_x$ (Replaced Part of Clay) and 25% Alumina |
|---|---|---|---|---|
| Calcined Catalyst Properties | | | | |
| Rare Earth wt. % | 1.7 | 1.9 | 1.9 | 1.8 |
| Na wt. % | 0.1 | 0.1 | 0.1 | 0.1 |
| SiO$_2$ wt. % | 37.1 | 36.7 | 29.6 | 30.3 |
| Al$_2$O$_3$ wt. % | 42.5 | 52.0 | 51.6 | 54.2 |

TABLE 4-continued

| Compositional Feature | Catalyst A 25% ZrAlPO$_x$ and No Alumina | Catalyst B 25% Alumina and No ZrAlPO$_x$ | Catalyst C 15% Ball Milled ZrAlPO$_x$ (Replace Part of Clay) and 25% Alumina | Catalyst D 15% Peptized ZrAlPO$_x$ (Replaced Part of Clay) and 25% Alumina |
|---|---|---|---|---|
| Surface Area m$^2$/g | 22 | 222 | 255 | 256 |
| Steam Deactivated Catalyst Properties | | | | |
| Surface Area m$^2$g | — | 123 | 122 | 120 |

F. Catalytic Cracking Process

Catalysts B through D were compared for catalytic cracking activity in a fixed-fluidized-bed ("FFB") reactor at 935° F., using a 1.0 minute catalyst contact time on a Arab Light Vacuum Gas Oil. The feedstock properties are shown in Table 5 below:

TABLE 5

| Charge Stock Properties | Vacuum Gas Oil |
|---|---|
| Gravity at 60° F. | 0.9010 |
| Refractive Index | 1.50084 |
| Aniline Point, ° F. | 164 |
| CCR, wt. % | 0.90 |
| Hydrogen, wt. % | 11.63 |
| Sulfur, wt. % | 2.8 |
| Nitrogen, ppm | 990 |
| Basic nitrogen, ppm | 250 |
| Distillation | |
| IBP, ° F. | 536 |
| 50 wt. %, ° F. | 868 |
| 99.5 wt. %, ° F. | 1170 |

These catalysts were then used in the FFB pilot plant. The catalyst performances are summarized in Table 6, where product selectivity was interpolated to a constant conversion, 65 wt. % conversion of feed to 430° F.$^-$ material.

TABLE 6

| Matrix | Catalyst B No Added ZrAlPO$_x$ | Catalyst C +15% Ball Milled ZrAlPO$_x$ | Catalyst D +15% Peptized ZrAlPO$_x$ |
|---|---|---|---|
| Conversion, wt. % | 65 | 65 | 65 |
| Cat/Oil | 3.8 | 3.3 | 3.6 |
| C$_5$$^+$ Gasoline, wt. % | 39.6 | 42.1 | 42.4 |
| LFO, wt. % | 25.4 | 25.6 | 25.5 |
| HFO, wt. % | 9.6 | 9.4 | 9.5 |
| Coke, wt. % | 5.1 | 5.3 | 5.1 |
| RON, C$_5$$^+$ Gasoline | 88.2 | 85.7 | 85.6 |
| H$_2$S, wt. % | 1.7 | 1.8 | 1.9 |
| C$_1$ + C$_2$ Gas, wt. % | 1.8 | 1.8 | 1.7 |
| Total C$_3$ Gas, wt. % | 6.3 | 4.9 | 4.9 |
| Total C$_4$ Gas, wt. % | 10.4 | 8.9 | 8.8 |
| C$_3$$^-$/total C$_3$ | 0.81 | 0.80 | 0.80 |
| C$_4$$^-$/total C$_4$ | 0.48 | 0.48 | 0.50 |
| C$_4$$^-$/C$_3$$^-$ | 0.98 | 1.10 | 1.13 |

The test results in Table 6 demonstrate that incorporation of ZrAlPO$_x$ into the zeolite matrix resulted in significantly improved gasoline yields (as much as 2.8 wt. %). This increase in gasoline yields for Catalysts C and D resulted mostly from lower C$_3$ and C$_4$ yields. The ZrAlPO$_x$ matrix "as-is"(Catalyst C) had a slightly higher coke-making tendency, but this tendency was alleviated by HCl peptization of the gel (Catalyst D).

The ZrAlPO$_x$ matrix has bottoms cracking activity, and a slight decrease in HFO (heavy fuel oil) yield is observed (0.2%). The bottoms yield differences are small for these catalysts, probably because all three catalysts convert nearly all of the crackable heavy ends at this conversion level. One negative aspect of the ZrAlPO$_x$ containing catalyst is the lower research octane number ("RON") of the produced gasoline, lowered by as much as 2.6.

The ZrAlPO$_x$ containing catalysts increased the H$_2$S yield by >10%, suggesting that this material may have potential for SO$_x$ removal and/or gasoline sulfur removal. The ZrAlPO$_x$ containing catalysts increased the butylene selectivity in C$_4$$^-$ gas and the C$_4$ olefin-to-C$_3$ olefin ratio. The results in Table 6 clearly show that the chemistry of ZrAlPO$_x$ is different from a typical active alumina matrix, which is usually added to improve bottoms cracking.

EXAMPLE 11

Fluid Catalytic Cracking with CeAlPO$_x$

A. Preparation of a CeAlPO$_x$ Material

A thermally stable, high surface area, mesoporous CeAlPO$_x$ material was prepared as described above in Example 2. The wet cake of CeAlPO$_x$ described above was used for the catalyst preparations that follow.

B. Preparation of a USY/CeAlPO$_x$/Clay Catalyst

A first catalyst, Catalyst E, was prepared using commercial Na-form USY zeolite with a silica to alumina ratio of 5.4 and a unit cell size of 24.54 Å. The Na-form USY was slurried and ball milled for 16 hours. A wet cake of the CeAlPO$_x$ material above was slurried in deionized water, and the pH of the resultant slurry was adjusted to 4 using concentrated HCl. The CeAlPO$_x$ material was then filtered, washed, and ball milled for 16 hours.

A uniform physical mixture of the milled USY slurry, the milled CeAlPO$_x$ slurry, binding agent, and kaolin clay was prepared. The final slurry contained 21% USY, 25% CeAlPO$_x$, 7% binding agent, and 47% clay, on a 100% solids basis. The mixture was spray-dried to fine spherical particles with approximately 70μ average particle diameter. The sprayed product was then air calcined, followed by ammonium exchange using an ammonium sulfate solution. The exchanged catalyst was further washed with deionized water, dried overnight, and calcined at 538° C. for three hours. The properties of the final catalyst are shown in Table 7.

C. Preparation of a USY/Alumina/Clay Catalyst

A second catalyst, Catalyst F, was prepared following the procedure in Example 11B, above, except that the CeAlPO$_x$ in Catalyst E was replaced with HCl-peptized pseudoboehmite alumina. The properties of Catalyst F also are shown in Table 7.

D. Preparation of a USY/CeAlPO$_x$/Alumina/Clay Catalyst

A third catalyst, Catalyst G, was prepared following the procedure in Example 11B, above, except that the amount of CeAlPO$_x$ was reduced and part of the clay was replaced with the HCl-peptized alumina used in Example 11C so that the spray dried slurry contained 21% USY, 15% CeAlPO$_x$, 25% alumina, 7% binding agent, and 32% clay, on a 100% solids basis HCl-peptized pseudoboehmite alumina. The final properties of Catalyst G are shown in Table 7.

E. Preparation of a USY/CeAlPO$_x$/Alumina/Clay Catalyst

A fourth catalyst, Catalyst H, was prepared following the procedure in Example 11D, above, except that the CeAlPO$_x$ in Catalyst G was replaced with HCl-peptized CeAlPO$_x$. The properties of Catalyst H also are shown in Table 7.

Before evaluating the catalysts for performance on a pilot unit for catalytic cracking, each catalyst was deactivated at 1450° F. and 35 psig for 20 hours using 50% steam and 50% air. The surface areas of the steamed catalysts are shown in Table 7.

TABLE 7

| Compositional Feature | Catalyst E 25% CeAlPO$_x$ and No Alumina | Catalyst F 25% Alumina and No CeAlPO$_x$ | Catalyst G 15% Ball Milled CeAlPO$_x$ (Replaced Part of Clay) and 25% Alumina | Catalyst H 15% Peptized CeAlPO$_x$ (Replaced Part of Clay) and 25% Alumina |
|---|---|---|---|---|
| Calcined Catalyst Properties | | | | |
| Rare Earth wt. % | 4.9 | 1.9 | 3.7 | 3.5 |
| Na wt. % | 0.1 | 0.1 | 0.1 | 0.2 |
| SiO$_2$ wt. % | 38.1 | 36.7 | 31.0 | 30.6 |
| Al$_2$O$_3$ wt. % | 46.5 | 52.0 | 57.9 | 55.5 |
| Surface Area m$^2$/g | 238 | 222 | 249 | 257 |
| Steam Deactivated Catalyst Properties | | | | |
| Surface Area m$^2$/g | 90 | 123 | 130 | 126 |

F. Catalytic Cracking Process

Catalysts E and F were compared for use in a catalytic cracking process using an FFB reactor at 935° F., having a 1.0 minute catalyst contact time using Arab Light Vacuum Gas Oil. The feedstock had the properties described in Table 5 above.

The performances of the catalysts are summarized in Table 8, where product selectivity was interpolated to a constant conversion, 65 wt. % conversion of feed to 430° F.⁻ material.

TABLE 8

| Matrix | Deactivated Catalyst E 25% CeAlPO$_x$ | Deactivated Catalyst F 25% Activated Al$_2$O$_3$ |
|---|---|---|
| Conversion, wt. % | 65 | 65 |
| Cat/Oil | 4.1 | 3.8 |
| C$_1$ + C$_2$ Gas, wt. % | 2.0 | 1.8 |
| Total C$_3$ Gas, wt. % | 5.4 | 6.3 |
| Total C$_4$ Gas, wt. % | 9.5 | 10.4 |
| C$_5$$^+$ Gasoline, wt. % | 40.7 | 39.6 |
| LFO, wt. % | 25.0 | 25.4 |
| HFO, wt. % | 10.0 | 9.6 |
| Coke, wt. % | 5.5 | 5.1 |
| RON, C$_5$$^+$ Gasoline | 87.6 | 88.2 |

The results in Table 8 suggest that the CeAlPO$_x$ matrix has bottoms cracking activity comparable to that of the activated alumina matrix. The catalysts provided comparable HFO yields. The CeAlPO$_x$ catalyst shows higher gasoline selectivity (1.1 wt. % yield advantage).

G. Product Selectivity Improvement With Addition of CeAlPO$_x$

Catalysts G and H were compared with Catalyst F to determine the benefits of adding CeAlPO$_x$ to an FCC catalyst. An FFB reactor was used with the Arab Light Vacuum Gas Oil described above in Table 5. The performances of the catalysts are summarized in Table 9, where product selectivity was interpolated to a constant conversion, 65 wt. % conversion of feed to 430° F.⁻ material.

TABLE 9

| Matrix | Catalyst F No Added CeAlPO$_x$ | Catalyst G +15% Ball Milled CeAlPO$_x$ | Catalyst H +15% Peptized CeAlPO$_x$ |
|---|---|---|---|
| Conversion, wt. % | 65 | 65 | 65 |
| Cat/Oil | 3.8 | 3.6 | 3.5 |
| C$_5$$^+$ Gasoline, wt. % | 39.6 | 40.7 | 42.0 |
| LFO, wt. % | 25.4 | 25.0 | 25.3 |
| HFO, wt. % | 9.6 | 10.0 | 9.7 |
| Coke, wt. % | 5.1 | 5.5 | 5.2 |
| RON, C$_5$$^+$ Gasoline | 88.2 | 87.8 | 85.5 |
| H$_2$S, wt. % | 1.7 | 1.9 | 1.9 |
| C$_1$ + C$_2$ Gas, wt. % | 1.8 | 1.8 | 1.7 |
| Total C$_3$ Gas, wt. % | 6.3 | 5.4 | 5.0 |
| Total C$_4$ Gas, wt. % | 10.4 | 9.5 | 9.1 |
| C$_3$⁻/total C$_3$ | 0.81 | 0.81 | 0.80 |
| C$_4$⁻/total C$_4$ | 0.48 | 0.52 | 0.49 |
| C$_4$⁻/C$_3$⁻ | 0.98 | 1.11 | 1.13 |

The test results in Table 9 demonstrate that incorporation of CeAlPO$_x$ into the matrix resulted in significantly improved gasoline yields (as much as 2.4 wt. %). The increase in gasoline yields for Catalysts G and H resulted mostly from lower C$_3$ and C$_4$ yields. The CeAlPO$_x$ matrix "as-is" (Catalyst G) had a slightly higher coke-making tendency, but this tendency was alleviated by HCl peptization of the gel (Catalyst H).

The bottoms yields are comparable for all three catalysts, probably because all three catalysts convert nearly all of the crackable heavy ends at this conversion level. One negative aspect of the CeAlPO$_x$ containing catalyst is that it lowered the research octane number ("RON") of the produced gasoline by as much as 2.7.

The CeAlPO$_x$ containing catalysts increased the H$_2$S yield by >10%, suggesting that this material may have potential for SO$_x$ removal and/or gasoline sulfur removal. The CeAlPO$_x$ containing catalysts increased the butylene selectivity in C$_4$⁻ gas, and the C$_4$ olefin-to-C$_3$ olefin ratio. The results in Table 9 clearly show that the chemistry of CeAlPO$_x$ is different from a typical active alumina matrix, which is usually added to improve bottoms cracking.

EXAMPLE 12

Fluid Catalytic Cracking Evaluation of CoAlPO$_x$ and VAlPO$_x$

CoAlPO$_x$ from Example 8 (Sample A) and VAlPO$_x$ from Example 9 (Sample F) were each pelleted and sized to an average particle size of approximately 70 micrometer (μ), then steamed in a muffle furnace at 1500° F. for 4 hours to simulate catalyst deactivation in an FCC unit. Ten weight percent of steamed pellets were blended with an equilibrium catalyst from an FCC unit. The equilibrium catalyst has very low metals level (120 ppm V and 60 ppm Ni).

The additives were tested for gas oil cracking activity and selectivity using an ASTM microactivity test (ASTM procedure D-3907). The vacuum gas oil feed stock properties are shown in a Table 10 below.

Table 10

| Charge Stock Properties | Vacuum Gas Oil |
|---|---|
| API Gravity | 26.6 |
| Aniline Point, ° F. | 182 |
| CCR, wt % | 0.23 |
| Sulfur, wt % | 1.05 |

Table 10-continued

| Charge Stock Properties | Vacuum Gas Oil |
|---|---|
| Nitrogen, ppm | 600 |
| Basic nitrogen, ppm | 310 |
| Ni, ppm | 0.32 |
| V, ppm | 0.68 |
| Fe, ppm | 9.15 |
| Cu, ppm | 0.05 |
| Na, ppm | 2.93 |
| Distillation | |
| IBP, ° F. | 358 |
| 50 wt %, ° F. | 716 |
| 99.5%, ° F. | 1130 |

A range of conversions was scanned by varying the catalyst-to-oil ratios and reactions were run at 980° F. Gasoline range product from each material balance was analyzed with a GC equipped with a sulfur detector (AED) to determine the gasoline sulfur concentration. To reduce experimental errors in sulfur concentration associated with fluctuations in distillation cut point of the gasoline, S species ranging only from thiophene to C4-thiophenes were quantified using the sulfur detector and the sum was defined as "cut-gasoline S". The sulfur level reported for "cut-gasoline S" excludes any benzothiophene and higher boiling S species which were trapped in a gasoline sample due to distillation overlap. Performances of the catalysts are summarized in Table 11, where the product selectivity was interpolated to a constant conversion, 65 wt % or 70 wt % conversion of feed to 430° F.⁻ material.

TABLE 11

| | Base Case | +10% CoAlPO$_x$ | +10% VAlPO$_x$ |
|---|---|---|---|
| Conversion, wt % | 70 | 70 | 70 |
| Cat/Oil | 3.2 | 3.2 | 3.7 |
| H$_2$ yield, wt % | 0.04 | +0.24 | +0.21 |
| C$_1$ + C$_2$ Gas, wt % | 1.4 | +0.3 | +0 |
| Total C$_3$ Gas, wt % | 5.4 | +0.1 | −0.2 |
| C$_3$ = yield, wt % | 4.6 | +0 | −0.1 |
| Total C$_4$ Gas, wt % | 11.1 | −0.2 | −0.4 |
| C$_4$ = yield, wt % | 5.4 | −0.1 | +0.1 |
| iC$_4$ yield, wt % | 4.8 | −0.2 | −0.4 |
| C$_5$⁺ Gasoline, wt % | 49.3 | −1.7 | −0.9 |
| LFO, wt % | 25.6 | −0.4 | +0.1 |
| HFO, wt % | 4.4 | +0.4 | −0.1 |
| Coke, wt % | 2.5 | +1.4 | +1.3 |
| Cut Gasoline S, PPM | 445 | 330 | 383 |
| % Reduction in Cut Gasoline S | Base | 26.0 | 13.9 |
| % Reduction in Gasoline S, Feed Basis | Base | 28.5 | 15.4 |

Data in Table 11 show that the gasoline S concentration was reduced by 26% by addition of CoAlPO$_x$, and 13.9% by the addition of VAlPO$_x$. The overall FCC yields (C$_1$–C$_4$ gas production, gasoline, LCO, and bottoms yields) changed only slightly with the CoAlPO$_x$ and VAlPO$_x$ addition, although some increases in H$_2$ and coke yields were observed. When the desulfurization results were recalculated to incorporate the gasoline-volume-loss, CoAlPO$_x$ gave 29% S reduction and VAlPO$_x$ gave 15% reduction.

EXAMPLE 13

Fluid Catalytic Cracking Evaluation of ZnAlPO$_x$

ZnAlPO$_x$ from Example 6 was pelleted and sized to an average particle size of approximately 70 micrometer ($\mu$), then steamed in a muffle furnace at 1500° F. for 4 hours to simulate catalyst deactivation in an FCC unit. Ten weight percent of steamed ZnAlPO$_x$ pellets were blended with a steam deactivated, Super Nova D$^{TR}$ FCC catalyst obtained from W. R. Grace. Performances of the ZnAlPO$_x$ are summarized in Table 12.

TABLE 12

| | Base Case | +10% ZnAlPO$_x$ |
|---|---|---|
| Conversion, wt % | 72 | 72 |
| Cat/Oil | 3.2 | 3.6 |
| H$_2$ yield, wt % | 0.09 | +0.03 |
| C$_1$ + C$_2$ Gas, wt % | 1.8 | +0.2 |
| Total C$_3$ Gas, wt % | 5.8 | +0.3 |
| C$_3$ = yield, wt % | 4.9 | +0.2 |
| Total C$_4$ Gas, wt % | 11.3 | +0.1 |
| C$_4$ = yield, wt % | 5.9 | −0.2 |
| iC$_4$ yield, wt % | 4.5 | +0.2 |
| C$_5$⁺ Gasoline, wt % | 50.0 | −1.0 |
| LFO, wt % | 23.7 | +0 |
| HFO, wt % | 4.3 | −0.2 |
| Coke, wt % | 2.9 | +0.4 |
| Cut Gasoline S, PPM | 477 | 449 |
| % Reduction in Cut Gasoline S | Base | 5.9 |
| % Reduction in Gasoline S, Feed Basis | Base | 7.7 |

It will be seen from Table 12 that gasoline sulfur concentration was reduced by 6% by addition of the ZnAlPO$_x$. The overall FCC yields (H$_2$, C$_1$–C$_4$ gas production, gasoline, LCO, and bottoms yields) changed only slightly with the ZnAlPO$_x$ addition, although some increase in coke yield was observed. When the desulfurization results were recalculated to incorporate the gasoline-volume-loss, ZnAlPO$_x$ gave 8% S reduction.

What is claimed is:

1. A mesoporous aluminophosphate material, comprising a solid aluminophosphate composition modified with at least one element selected from the group consisting of zirconium, lanthanum, manganese, cobalt, and zinc, wherein the mesoporous aluminophosphate material has a specific surface area of at least 100 m²/g, an average pore diameter less than or equal to 100 Å, and a pore size distribution such that at least 50% of the pores have a pore diameter less than 100 Å and further, that 10%–56% of the pores have a pore diameter of 50–100 Å, while 1%–35% of the pores have a pore diameter of >150 Å.

2. The mesoporous aluminophosphate material according to claim 1 and having an average pore diameter of 30 to 100 Å.

3. The mesoporous aluminophosphate material according to claim 1 and having a specific surface area of at least 175 m²/g.

4. The mesoporous aluminophosphate material according to claim 1 and having a pore volume in the range from 0.10 cc/g to 0.75 cc/g.

5. A method for making a mesoporous aluminophosphate material according to claim 1, comprising the steps of:
   (a) providing an aqueous solution containing a phosphorus component; an inorganic aluminum containing component; and an inorganic modifying component containing at least one element selected from the group consisting of zirconium, lanthanum, manganese, cobalt, and zinc; with a molar ratio of phosphorus component of 0.02–0.90, a molar ratio of inorganic aluminum containing component of 0.02–0.90 and a molar ratio of inorganic modifying component of 0.01–0.50;

(b) adjusting the pH of said aqueous solution into the range of about 7 to about 12 so that a solid material is precipitated from said solution; and then (c) recovering the solid material from said solution, wherein the solid material includes the mesoporous aluminophosphate material.

6. A method according to claim 5, wherein no organic reagents or solvents are used in the method.

7. A method according to claim 5, wherein the inorganic aluminum containing component includes sodium aluminate and the method includes the further step of lowering the sodium level of the solid material recovered in step (c).

8. A method according to claim 7, wherein the sodium level of the solid material recovered in step (c) is reduced to less than 1.0 wt %.

9. A method according to claim 5, further including exposing the pH adjusted aqueous solution to hydrothermal or thermal treatment at about 100° C. to about 200° C.

10. A method according to claim 5, wherein the inorganic modifying component includes a sulfate or a nitrate of zirconium, cerium, lanthanum, manganese, cobalt, zinc, or vanadium.

11. A method according to claim 5, wherein said inorganic modifying component is modified with at least one element selected from the group consisting of manganese, cobalt, and zinc.

12. A method according to claim 5, wherein said inorganic modifying component includes a sulfate or a nitrate of an element selected from the group consisting of manganese, cobalt, and zinc.

13. The mesoporous aluminophosphate material according to claim 1 which is modified with an element selected from the group consisting of manganese, cobalt, and zinc.

14. A mesoporous aluminophosphate material, comprising a solid aluminophosphate composition modified with at least one element selected from the group consisting of manganese, cobalt, and zinc, wherein the mesoporous aluminophosphate material exhibits hydrothermal stability after steaming at 1500° F. (815° C.) for four hours with 100% steam at atmospheric pressure by maintaining a surface area of at least 81 $m^2/g$, has a specific surface area of at least 100 $m^2/g$, an average pore diameter less than or equal to 100 Å, and a pore size distribution such that at least 50% of the pores have a pore diameter less than 100 Å, and further that 10%–56% of the pores have a pore diameter of 50–100 Å, while 1%–35% of the pores have a pore diameter of >150 Å.

15. The method according to claim 5, wherein said molar ratio of said phosphorus component is 0.05–0.85.

16. The method according to claim 5, wherein said molar ratio of said inorganic aluminum containing component is 0.05–0.85.

17. The method according to claim 5, wherein said molar ratio of said inorganic modifying component is 0.02–0.40.

18. The method according to claim 5, wherein said mesoporous aluminophosphate material is modified with an element selected from the group consisting of cobalt and zinc.

19. The mesoporous aluminophosphate material according to claim 1, wherein the mesoporous aluminophosphate material contains less than 1.0 wt % Na.

* * * * *